(12) United States Patent
Lee et al.

(10) Patent No.: US 11,478,942 B1
(45) Date of Patent: Oct. 25, 2022

(54) ROBOTIC PICKING ASSEMBLIES CONFIGURED TO GRASP MULTIPLE ITEMS

(71) Applicant: Amazon Technologies, Inc., Seattle, WA (US)

(72) Inventors: Jeongseok Lee, Seattle, WA (US); Aaron Joseph Parness, Mercer Island, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 16/891,874

(22) Filed: Jun. 3, 2020

(51) Int. Cl.
```
B25J 15/06      (2006.01)
B25J 19/02      (2006.01)
B25J 18/02      (2006.01)
```

(52) U.S. Cl.
CPC ....... *B25J 15/0658* (2013.01); *B25J 15/0666* (2013.01); *B25J 15/0683* (2013.01); *B25J 15/0691* (2013.01); *B25J 18/025* (2013.01); *B25J 19/023* (2013.01)

(58) Field of Classification Search
CPC .......... B25J 15/0641; B25J 15/0658; B25J 15/0666; B25J 15/0691; B25J 13/08; B25J 13/081; B25J 13/082; B25J 13/084; B25J 19/023; B66C 1/0237; B66C 1/0243; B66C 1/025; B65G 47/918
USPC ........................................................ 294/188
See application file for complete search history.

(56) References Cited

U.S. PATENT DOCUMENTS

| | | | | |
|---|---|---|---|---|
| 6,131,973 A * | 10/2000 | Trudeau | ............... | B25J 15/0616 294/186 |
| 6,149,375 A * | 11/2000 | Hebrank | ............... | A01K 45/007 414/737 |
| 6,860,534 B2 * | 3/2005 | Vogel | ................... | B65G 47/918 294/188 |
| 7,017,961 B1 * | 3/2006 | Parnell | ................. | B25J 15/0616 294/188 |
| 7,296,834 B2 * | 11/2007 | Clark | ................... | B25J 15/0616 294/65 |
| 8,960,751 B2 * | 2/2015 | Regan | ................. | B25J 15/0691 294/188 |
| 10,392,201 B2 * | 8/2019 | Montoya | ............... | B25J 15/0625 |
| 10,539,452 B2 * | 1/2020 | Taira | .................... | B25J 15/0061 |
| 2013/0110280 A1 * | 5/2013 | Folk | ....................... | B25J 9/1697 700/215 |

(Continued)

*Primary Examiner* — Dean J Kramer
(74) *Attorney, Agent, or Firm* — Eversheds Sutherland (US) LLP

(57) ABSTRACT

Systems, methods, and computer-readable media are disclosed for robotic picking assemblies configured to grasp multiple items. In one embodiment, an example system may include a picking assembly coupled to a vacuum system, the picking assembly having a first suction cup assembly with a first suction cup and a first sensor, and a second suction cup assembly with a second suction cup and a second sensor. The example system may include a controller configured to cause the picking assembly to grasp a plurality of items, where the plurality of items includes a first item and a second item. The controller may be further configured to cause the picking assembly to move from a first position to a second position, and cause the picking assembly to release the first item at a first time and the second item at a second time.

15 Claims, 8 Drawing Sheets

(56) References Cited

U.S. PATENT DOCUMENTS

2019/0084012 A1* 3/2019 McCoy, Jr. .......... B25J 15/0675

* cited by examiner

ROBOTIC PICKING ASSEMBLIES CONFIGURED TO GRASP MULTIPLE ITEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
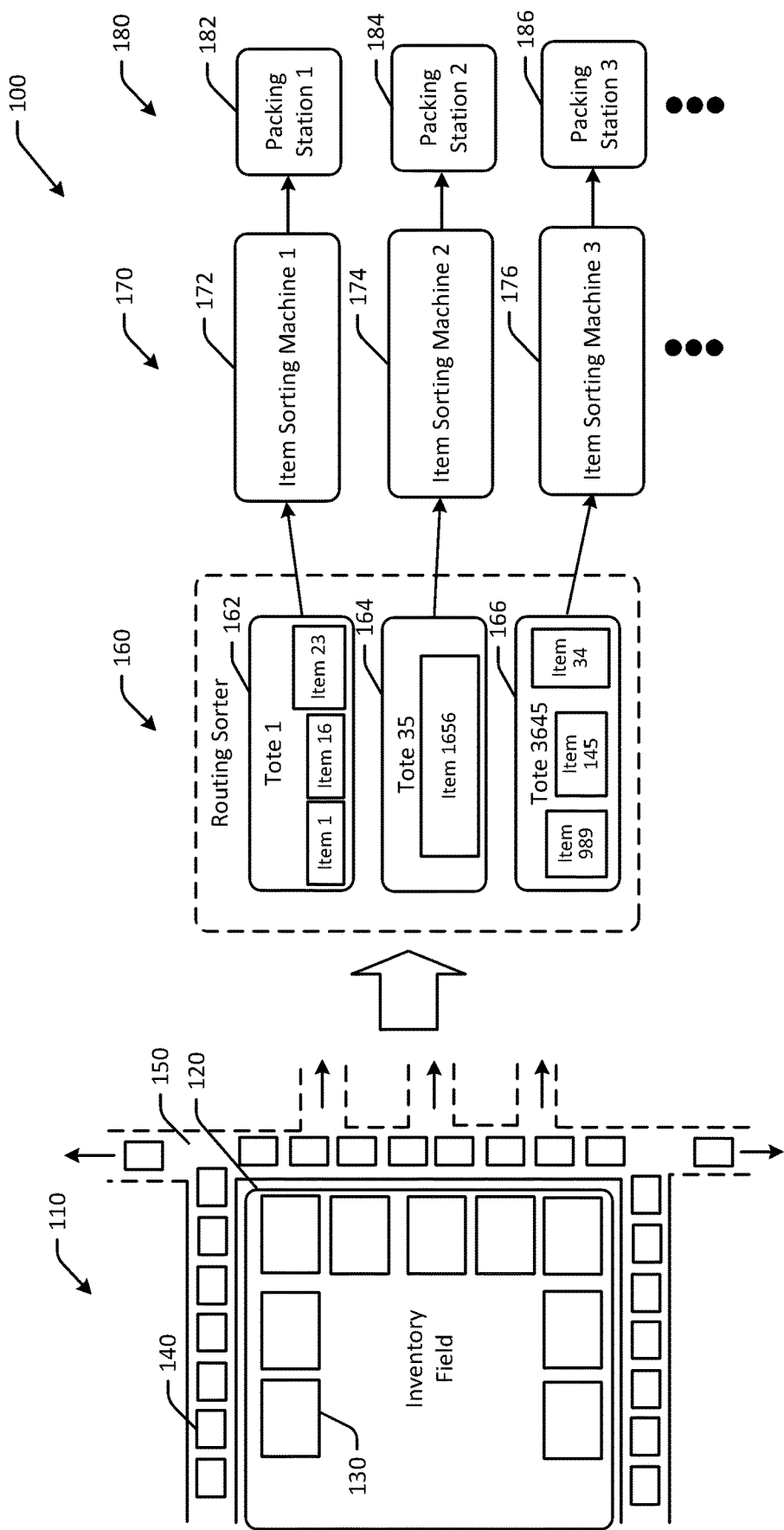
FIG. 1 is a hybrid schematic illustration of an example use case for robotic picking assemblies configured to grasp multiple items and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. In addition, using a robot or other machine to grasp an item in a cluttered environment, such as a box or tote with multiple items inside, may be difficult to achieve reliably using mechanical systems. In some instances, such as unloading a number of items from a container, where the items are not necessarily arranged in an order and may be cluttered, picking assemblies may have difficulty grasping more than one item and individually releasing grasped items.

Embodiments of the disclosure include methods and systems for automated handling of items and objects regardless of packaging that may improve processing and fulfillment of orders, or other object aggregation tasks. Certain embodiments include robotic arms with picking assemblies that are configured to grasp multiple items at the same time, such as a layer of items from a container, in conjunction with vacuum suction to pick up and/or release, or otherwise handle, objects, so as to increase throughput and speed of object handling. Some embodiments may be configured to individually release grasped items into one or more different locations, such as other containers, conveyors, chutes, and the like. Certain embodiments may identify grasped items using computer vision. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for robotic picking assemblies configured to grasp multiple items and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, robotic picking assemblies configured to grasp multiple items may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include robotic picking assemblies configured to grasp multiple items, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a single-item or multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, robotic picking assemblies configured to grasp multiple items as described herein may be used. As a result, manual effort can be redirected to other tasks.

Embodiments of the disclosure include robotic picking assemblies configured to grasp multiple items. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, the robotic picking assemblies configured to grasp multiple items described herein may accurately grasp multiple items in cluttered environments, regardless of an amount of an item available for grasping, and may provide control over individual release of items that have been grasped, with repeatable performance. Certain embodiments may be configured to automatically identify items that have been grasped, and to determine an order of release of the items.

Embodiments of the disclosure may therefore provide a robust object handling system that improves functionality and flexibility with respect to the number and types of objects that can be handled using robotic or other mechanical equipment. Some embodiments may include sensors coupled to or integrated with suction cups to provide streamlined design in a compact form factor.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
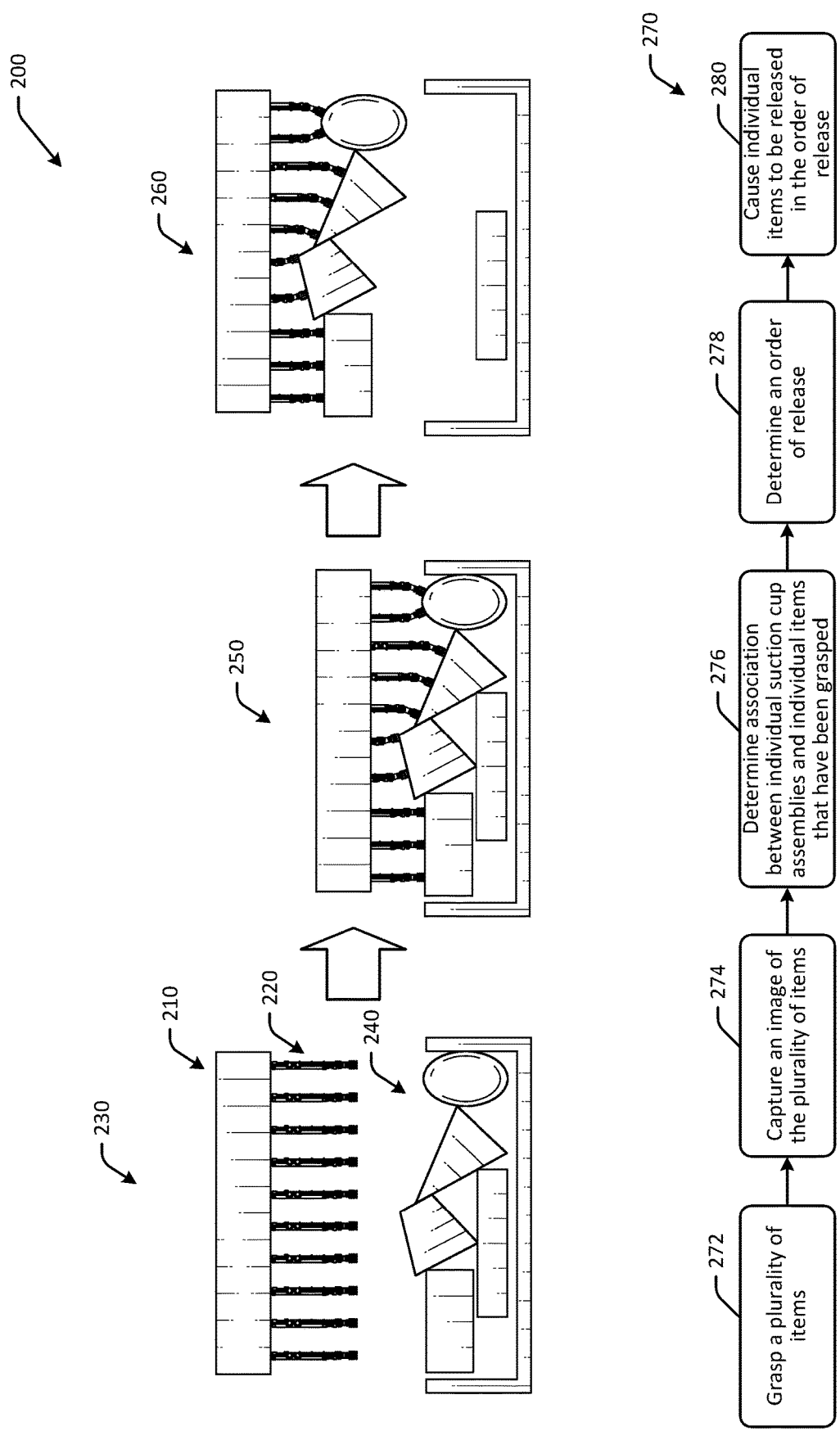
FIG. 2 is a schematic illustration of an example use case for robotic picking assemblies configured to grasp multiple items at the same time in accordance with one or more embodiments of the disclosure.

FIG. 2 is a schematic illustration of an example use case 200 for robotic picking assemblies configured to grasp multiple items at the same time in accordance with one or more embodiments of the disclosure. Other embodiments may include additional or fewer components. The illustration of FIG. 2 may not be to scale, and may not be illustrated to scale with respect to other figures. The robotic picking assembly configured to grasp multiple items illustrated in FIG. 2 may be the picking assemblies discussed with respect to FIG. 1.

In FIG. 2, a robotic picking assembly 210 may be used to pick up objects of various form factors and with different packaging materials (e.g., loose plastic bag packaging, boxes, etc.), as well as objects of different sizes and shapes, such as cylindrical objects, round objects, etc. Typically, picking up such different items using the same end-of-arm-tool or picking assembly may be difficult due to a number of factors, such as weight shifting during movement of the object (e.g., movement of an object in a loose bag packaging, leading to a change in center of gravity, etc. for the object). In addition, grasping more than one item at a time may create difficulties in releasing items individually. Unlike typical picking assemblies, robotic picking assemblies described herein may not need to be aligned with objects in any particular manner, and may pick up such objects regardless of packaging, and regardless of a shape or size of the object. In addition, embodiments may accurately grasp objects in cluttered environments, such as a container or bin with multiple items inside.

To accurately and repeatedly grasp items in cluttered environments, the picking assembly 210 may include a number of suction cup assemblies 200. One or more individual suction cup assemblies 220 may be used to grasp items. The picking assembly may be coupled to various robotic manipulators, such as a gantry, a robotic arm, or other device.

As illustrated in FIG. 2 at a first instance 230, the suction cup assemblies 220 of the picking assembly 210 may be positioned above a container with items 240. The items 240 may be cluttered and in different layers. The picking assembly 210 may be used to grasp multiple items, such as a layer of items, and to remove the items from the container. For example, at a second instance 250, the picking assembly 210 may be moved such that the suction cup assemblies 220 are in contact with a layer of items. At a third instance 260, the picking assembly 210 may be lifted or raised, and a plurality of items may be grasped by the suction cup assemblies 220.

Figure 4:
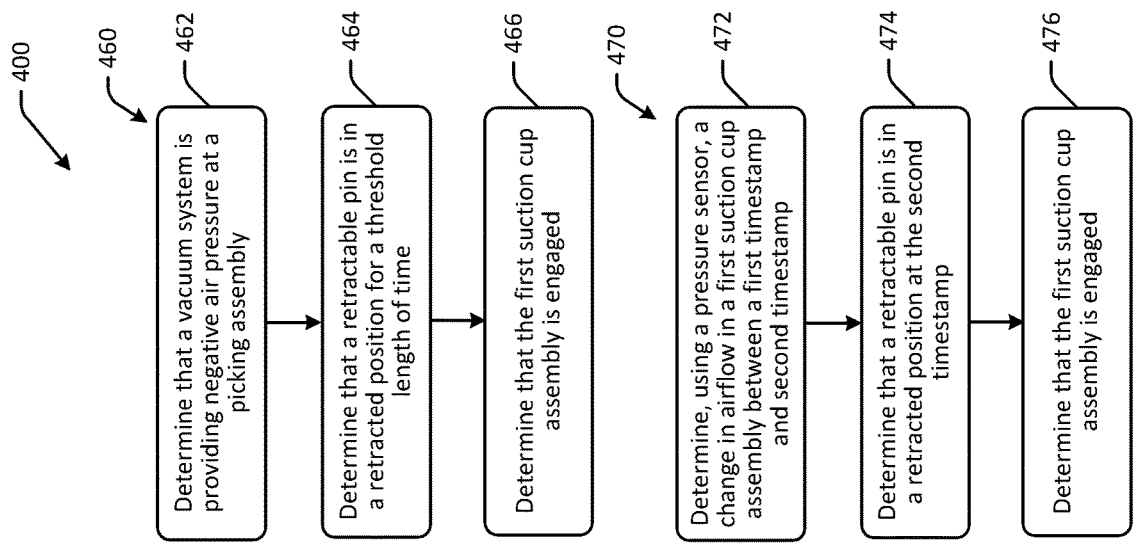
FIG. 4 is a schematic illustration of a suction cup assembly in cross-sectional view and a picking assembly in a bottom view in accordance with one or more embodiments of the disclosure.
Figure 4:
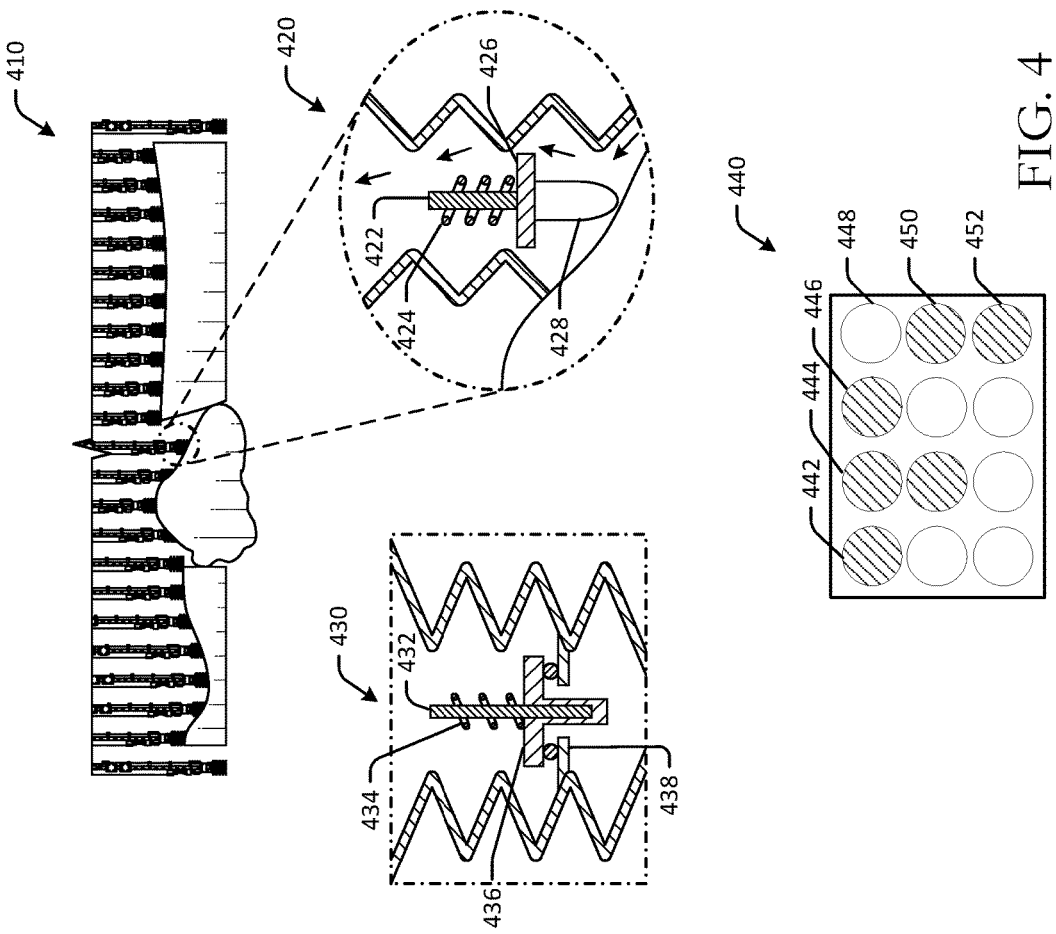

Individual suction cup assemblies may include a seal device or sensor that, when pressed, opens up a seal that applies a vacuum or otherwise allows negative air pressure to leave the suction cup assembly, as discussed with respect to FIG. 4. If a particular suction cup assembly is not pressed (e.g., no item is in contact with it, etc.), the seal may be locked before activating vacuum to prevent formation of a seal when vacuum suction is activated.

The picking assembly 210 may be coupled to a vacuum suction system that may provide vacuum flow or negative air pressure to the individual suction cup assemblies. The negative air pressure may flow through the suction cups coupled to the individual suction cup assemblies, which may provide a force that can be used to grasp and lift items out of a container, off of a conveyor, or from another location. To release an item, for example onto a conveyor belt, the negative air pressure may be reduced and/or positive air pressure may be applied.

To operate the picking assembly 210, an example process flow 270 may be executed by a controller or computer system in communication with the picking assembly 210. For example, the picking assembly 210 may be coupled to a vacuum system, and may include a first suction cup assembly having a first suction cup and a first sensor, as well as a second suction cup assembly having a second suction cup and a second sensor.

At block 272, a plurality of items may be grasped. For example, the controller may be configured to cause the picking assembly 210 to grasp a plurality of items, where the plurality of items includes a first item and a second item. At block 274, an image of the plurality of items may be captured. For example, the controller may cause a camera system to capture an image of the items that have been grasped by the picking assembly 210. At block 276, an association between individual suction cup assemblies and individual items that have been grasped may be determined. For example, the controller may determine which suction cup assemblies of the picking assembly 210 are engaged on items, and using the image, may determine a location of individual items and corresponding suction cup assemblies. The controller may therefore determine associations between individual suction cup assemblies and individual items that have been grasped. At block 278, an order of release may be determined. For example, the controller may determine that a first item is to be released or dropped at a first location, a second item is to be released second (to the same location or a different location), and so forth. At block 280, individual items may be caused to be released in the order of release. For example, the controller may cause the picking assembly 210 to move from a first position to a second position, and may cause the picking assembly 210 to release the first item and the second item in the order of release. In some instances, positive air pressure may be applied to specific suction cup assemblies to release a particular item.

The picking assembly 210 may be coupled to a robotic arm or other manipulator that is configured to move the picking assembly from the first position to the second position. The robotic picking assembly may therefore be used to retrieve objects of different sizes, shapes, form factors, and/or having different types of packaging from one location to another without dropping or losing a grip on the object. Although certain example objects are illustrated in FIG. 2, any suitable object can be picked up by embodiments of the disclosure, including off-center flat objects, round objects, long narrow objects, circular objects, and so forth.

Accordingly, some embodiments may include a controller configured to cause the picking assembly to pick up an object by positioning the picking assembly adjacent to a pile of objects, causing the vacuum suction system to provide negative air pressure, actuating the picking assembly from a raised position to a lowered position, and causing the picking assembly to move upwards and/or in a lateral direction. For example, the picking assembly may be coupled to a computer system or a controller, which may or may not be the same controller of a robotic arm.

Figure 3:
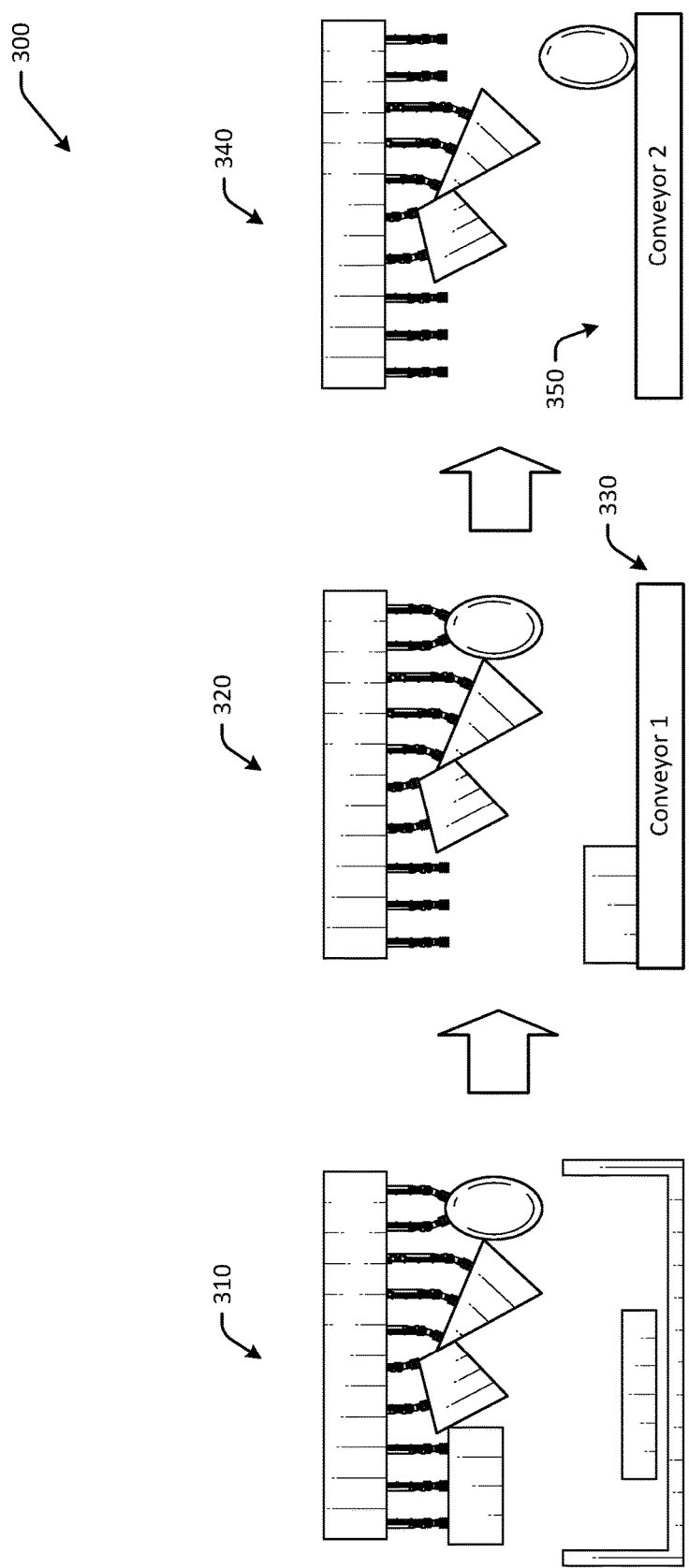
FIG. 3 is a schematic illustration of an example use case for robotic picking assemblies configured to release items individually in accordance with one or more embodiments of the disclosure.

FIG. 3 is a schematic illustration of an example use case 300 for robotic picking assemblies configured to release items individually in accordance with one or more embodiments of the disclosure. Other embodiments may include additional or fewer components. The illustration of FIG. 3 is not to scale, and may not be illustrated to scale with respect to other figures. The picking assembly illustrated in FIG. 3 may be the same picking assembly and/or robotic picking assemblies configured to grasp multiple items discussed with respect to FIGS. 1-2.

In FIG. 3, the same picking assembly 210 of FIG. 2 is depicted at a first instance 310 with the plurality of items grasped. The picking assembly may be coupled to a vacuum suction system that is configured to generate negative air pressure to pick up items, and positive air pressure to release an item. At a second instance 320, a first item may be released by the picking assembly at a first location, such as onto a first conveyor 330. At a third instance 340, a second item may be released by the picking assembly at a second location, such as a second conveyor 350. In this manner, multiple items can be grasped at the same time but dropped individually at different locations (or at the same location to singulate items) without having to grasp items individually.

FIG. 4 is a schematic illustration 400 of a suction cup assembly in cross-sectional view and a picking assembly in a bottom view in accordance with one or more embodiments of the disclosure. Other embodiments may include additional or fewer components. The illustration of FIG. 4 is not to scale, and may not be illustrated to scale with respect to other figures. The components illustrated in FIG. 4 may be components of the picking assemblies discussed with respect to FIGS. 1-3.

In FIG. 4, a picking assembly 410 is depicted grasping a plurality of items. A first suction cup 420 of a first suction cup assembly is depicted in a close-up cross-sectional view. In some embodiments, one or more sensors may be disposed in the first suction cup assembly. The sensor may be a pressure sensor or another sensor configured to detect airflow characteristics, such as vacuum pressure. In some embodiments, the sensor may be a contact sensor configured to open or close a seal at the suction cup based on whether the suction cup is in contact with an item. In an example contact sensor embodiment, the contact sensor may include a retractable pin 422 coupled to a base 426 (which may be coupled to the suction cup 420). Other forms of contact sensors may be used, including contact switches, mechanical contact sensors, and other sensors configured to detect contact with another object. The retractable pin 422 may be biased toward the base 426 using a spring 424 or other mechanism A portion 428 of the sensor may be disposed adjacent to a distal end of the suction cup 420. If the suction cup 420 contacts an item, the portion 428 of the sensor 420 may be pushed inwards, thereby displacing the retractable pin 422 from a default position, and a seal formed between the retractable pin 422 and the base 426 and/or the suction cup 420 may be opened. As a result, vacuum suction may be provided at the suction cup 420 to grasp the item with which it is in contact. Vacuum flow is depicted by directional arrows in the example of FIG. 4. In FIG. 4, the portion 428 is illustrated in a displaced or retracted position, and when in the default position, may be positioned at a distal end of the suction cup and may optionally form a seal such that no vacuum flow passes through the suction cup assembly.

In another embodiment of a sensor 430, a retractable pin 432 may be coupled to a base 436, where the retractable pin 432 is configured to move from a default position to a retracted position. A spring 434 or other mechanism may be coupled to the retractable pin 432 and configured to bias the retractable pin 432 to the default position. As the retractable pin 432 is displaced, a seal between the base 436 and a portion of the suction cup 438 may be broken or opened, thereby allowing airflow to pass (e.g., vacuum suction to be provided, etc.). The contact sensors may be used to determine whether a particular suction cup is engaged on an item, or if the suction cup is disengaged. Data related to the engagement of suction cups may be used to determine which suction cup assemblies are to be deactivated in order to release a particular item that is grasped by the picking assembly. In other embodiments, instead of using the retractable pin sensor 430, other types of sensors, such as a proximity sensor, a contact sensor, or the like may be used to provide feedback related to positioning of the suction cup 438 relative to an item, which may be used to determine whether a particular suction cup assembly is engaged or disengaged.

Accordingly, as depicted in a bottom view 440 of the picking assembly, one or more of the suction cup assemblies may be determined to be engaged. For instance, a first suction cup assembly 442 may be determined to be engaged (as denoted with shading), a second suction cup assembly 444 may be determined to be engaged, a third suction cup assembly 446 may be determined to be engaged, a fourth suction cup assembly 448 may be determined to be disengaged (as denoted without shading), a fifth suction cup assembly 450 may be determined to be engaged, a sixth suction cup assembly 452 may be determined to be engaged, and so forth. The determinations may be correlated with image data to determine which suction cup assemblies are engaged with which items, such that specific individual items can be released via disengagement of particular suction cup assemblies.

An example process flow 460 may be used to determine whether a particular suction cup assembly is engaged or disengaged without the use of a pressure sensor and/or pressure sensor measurement.

At block 462, it may be determined that a vacuum system is providing negative air pressure at the picking assembly. For example, a signal may be received from a pump or other vacuum system indicating that negative air pressure is being provided at the picking assembly.

At block 464, it may be determined that a retractable pin is in a retracted position for a threshold length of time. For example, a controller may determine that the retractable pin has been displaced for a threshold length of time. The threshold length of time may be configurable. Displacement of pin for the threshold length of time may represent that the suction cup of the suction cup assembly is coupled to an item. The threshold length of time may be the amount of time that it takes for the picking assembly and/or the suction cup assembly to be moved into position and/or to contact items in a container, where there may be a relatively high likelihood that after the threshold length of time, the suction cup will be in contact with an item that it will grasp, or else the suction cup assembly will not grasp an item during that instance.

At block 466, it may be determined that the first suction cup assembly is engaged. For example, the first suction cup assembly may be coupled to or engaged with an item, or a seal on an item is of high quality, and may therefore result in an item being lifted by the suction cup assembly. The suction cup assembly may therefore be engaged.

An example process flow 470 may be used to determine whether a particular suction cup assembly is engaged or disengaged with the use of a pressure sensor and/or pressure sensor measurement.

At block 472, a change in airflow in the first suction cup assembly between a first timestamp and second timestamp may be determined using a pressure sensor. For example, a pressure sensor may be disposed in or otherwise coupled to a suction cup of the first suction cup assembly. The pressure sensor may be different than the retractable pin sensor. The pressure sensor may be used to determine a transient or change in airflow (e.g., pressure measurement, etc.) in the first suction cup assembly between a first time and a second time. The change may be a result of decreased airflow due to a seal forming between the suction cup and an item that is grasped by the suction cup.

At block 474, it may be determined that a retractable pin is in a retracted position at the second timestamp. For example, a controller may determine that the retractable pin is in a retracted position at the second timestamp. This may indicate that an airtight seal has been formed between the suction cup and an item, or that a seal with low leakage has been formed between the suction cup and the item. In this embodiment, a threshold length of time may not be needed, and the determination may be made at or after the second timestamp.

At block 476, it may be determined that the first suction cup assembly is engaged. For example, the first suction cup assembly may be coupled to or engaged with an item, or a seal on an item is of high quality, and may therefore result in an item being lifted by the suction cup assembly. The suction cup assembly may therefore be engaged.

Although illustrated as a rectangular array of suction cup assemblies in the illustrated example, other embodiments may include suction cup assemblies in a circular arrangement, an elliptical arrangement, an oval arrangement, a different type of array, a random pattern, and other configurations of suction cup assemblies may be included.

Although a single suction cup assembly is illustrated in FIG. 4, in some embodiments, more than one suction cup assembly may be used in conjunction with each other to pick up objects. Some embodiments may include multiple picking assemblies arranged to pick up objects. Such an arrangement may improve the ability of the device to pick up objects with non-uniform surface features, such as heavy bags of cat food.

Figure 5:
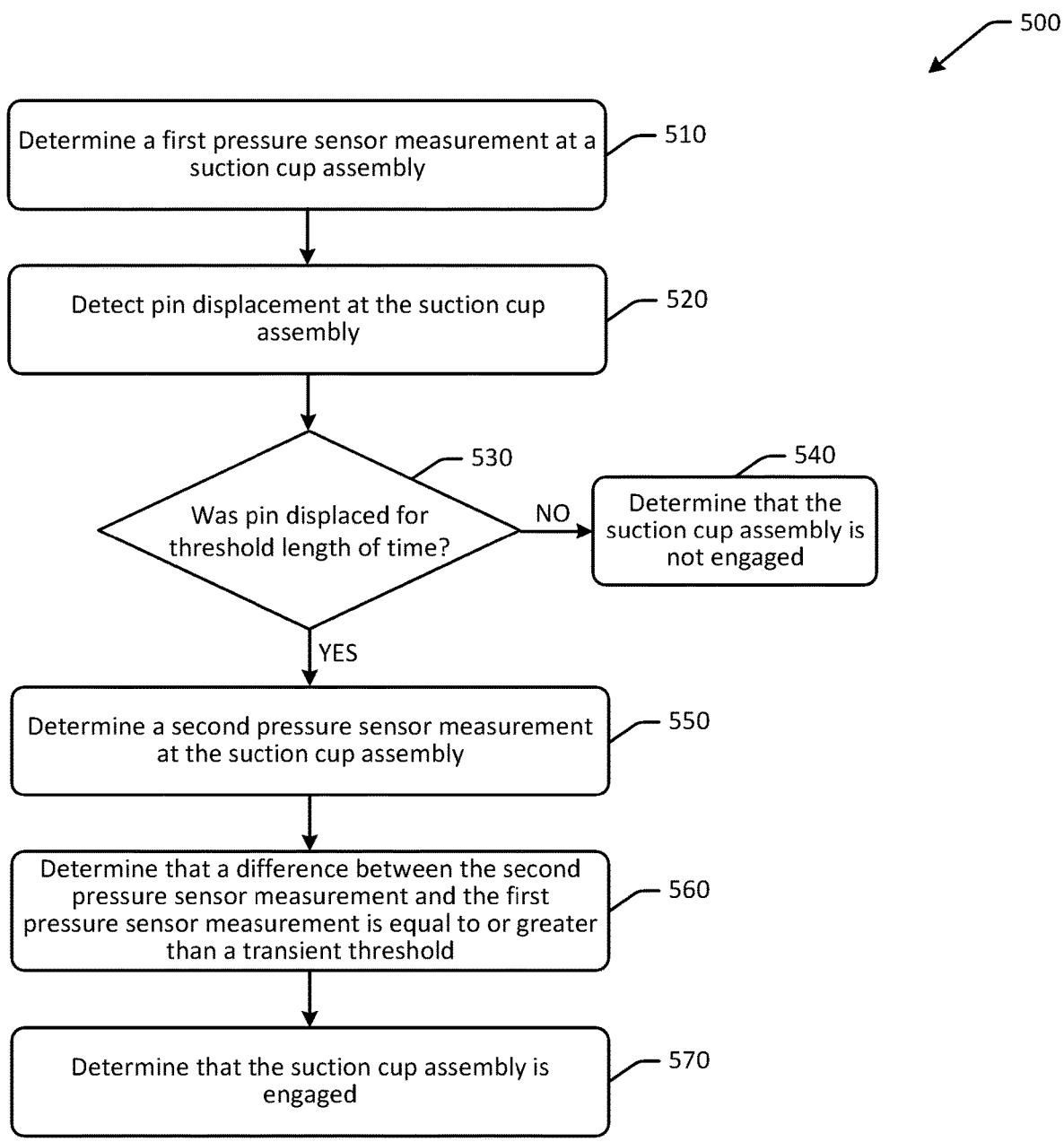
FIG. 5 is a schematic illustration of an example process flow for determining whether a suction cup assembly is engaged in accordance with one or more embodiments of the disclosure.

FIG. 5 is a schematic illustration of an example process flow 500 for determining whether a suction cup assembly is engaged in accordance with one or more embodiments of the disclosure. Although example embodiments of the disclosure may be described in the context of pin displacement, it should be appreciated that the disclosure is more broadly applicable to any suitable sensor type. Some or all of the blocks of the process flows in this disclosure may be performed in a distributed manner across any number of devices. The operations of the process flow 500 may be optional and may be performed in a different order.

At block 510, a first pressure sensor measurement at a suction cup assembly may be determined. For example, a computer system or one or more controllers may determine a first pressure sensor measurement at a suction cup assembly. The first pressure sensor measurement may be determined using a pressure sensor that is disposed in the suction cup assembly. The pressure sensor measurement may represent an airflow through the suction cup assembly. In other embodiments, a different type of sensor may be used, such as a vacuum sensor, an airflow sensor, or another sensor that can measure data related to airflow. Some embodiments may include airflow sensors and corresponding airflow sensor measurements instead of, or in addition to, pressure sensor measurements in the process flow 500.

At block 520, pin displacement at the suction cup assembly may be detected. For example, a computer system or one or more controllers may detect pin displacement at the suction cup assembly. The pin displacement may represent the presence of negative air pressure, or suction, in the suction cup assembly. For example, the pin may be part of a sensor that is pulled inwards into the suction cup assembly as a result of vacuum suction, and may return to a default position without the presence of vacuum suction (e.g., via a spring or other mechanism, etc.). The controller may determine that the pin is displaced from the default position. In some embodiments, the pin may be coupled to the suction cup of the suction cup assembly.

At determination block 530, a determination may be made as to whether the pin has been displaced for a threshold length of time. For example, a computer system or one or more controllers may determine whether the pin has been displaced for a threshold length of time. The threshold length of time may be configurable, and may be any suitable value. Displacement of pin for the threshold length of time may represent that the suction cup of the suction cup assembly is coupled to an item. The threshold length of time may be the amount of time that it takes for the picking assembly and/or the suction cup assembly to be moved into position and/or to contact items in a container, where there may be a relatively high likelihood that after the threshold length of time, the suction cup will be in contact with an item that it will grasp, or else the suction cup assembly will not grasp an item during that instance.

If it is determined at determination block 530 that the pin was not displaced for the threshold length of time, the determination at block 530 may be negative and the process flow may end at block 540. At block 540, it may be determined that the suction cup assembly is not engaged. For example, the suction cup assembly may not be coupled to or engaged with an item, or a seal on an item is of poor quality, and will not result in an item being lifted by the suction cup assembly. The suction cup assembly may therefore not be engaged.

If it is determined at determination block 530 that the pin was or has been displaced for the threshold length of time, the determination at block 530 may be positive. This may indicate that vacuum suction was applied, the suction cup came into contact with an item, and a seal was formed, thereby resulting in the pin remaining displaced for the threshold length of time. In some embodiments, the vacuum suction may be disabled prior to expiration of the threshold length of time. The process flow may proceed to block 550.

At block 550, a second pressure sensor measurement may be determined at the suction cup assembly. The second pressure sensor measurement may be used to determine whether a transient or delta is present relative to the first pressure sensor measurement. For example, a computer system or one or more controllers may determine a second pressure sensor measurement at the suction cup assembly. The second pressure sensor measurement may be determined using a pressure sensor that is disposed in the suction cup assembly. The pressure sensor measurement may represent an airflow through the suction cup assembly. In other embodiments, a different type of sensor may be used, such as a vacuum sensor or another sensor that can measure data related to airflow.

At block 560, it may be determined that a difference between the second pressure sensor measurement and the first pressure sensor measurement is equal to or greater than a transient threshold. For example, a computer system or one or more controllers may determine that a difference between the second pressure sensor measurement and the first pressure sensor measurement is equal to or greater than a transient threshold. The difference may be determined by subtraction or another algorithmic determination. The difference may represent a change in vacuum suction between a first point in time and a second point in time. The difference may correspond to whether or not the suction cup is sealed on an item, and if so, a quality of the seal. For example, a relatively low difference may mean that the suction cup is not sealed on an item or a seal quality is poor, whereas a relatively high difference may mean that the suction cup is sealed on an item and/or a seal quality is high. The first pressure sensor measurement may be a default measurement, such as at a time before the picking assembly is lowered onto items, and the second pressure sensor measurement may be after the picking assembly is lowered onto items. The difference may therefore be used as a signal of seal quality for the suction cup assembly.

At block 570, it may be determined that the suction cup assembly is engaged. For example, the suction cup assembly may be coupled to or engaged with an item, or a seal on an item is of high quality, and may therefore result in an item being lifted by the suction cup assembly. The suction cup assembly may therefore be engaged.

The process flow 500 may therefore be used to determine whether individual suction cup assemblies are sealed to items, or otherwise engaged on items, and may use pin dislocation and pressure changes to determine whether a suction cup assembly is engaged. The determinations may be used in conjunction with image data to determine which items are coupled to or being lifted by which engaged suction cup assemblies.

Vacuum suction to disengaged suction cup assemblies may be optionally disabled. For example, if the controller determines that a first suction cup assembly is engaged, a second suction cup assembly is engaged, and a third suction cup assembly is disengaged, the controller may cause negative air pressure at the third suction cup assembly to cease or otherwise be disabled (e.g., using a valve, etc.).

Figure 6:
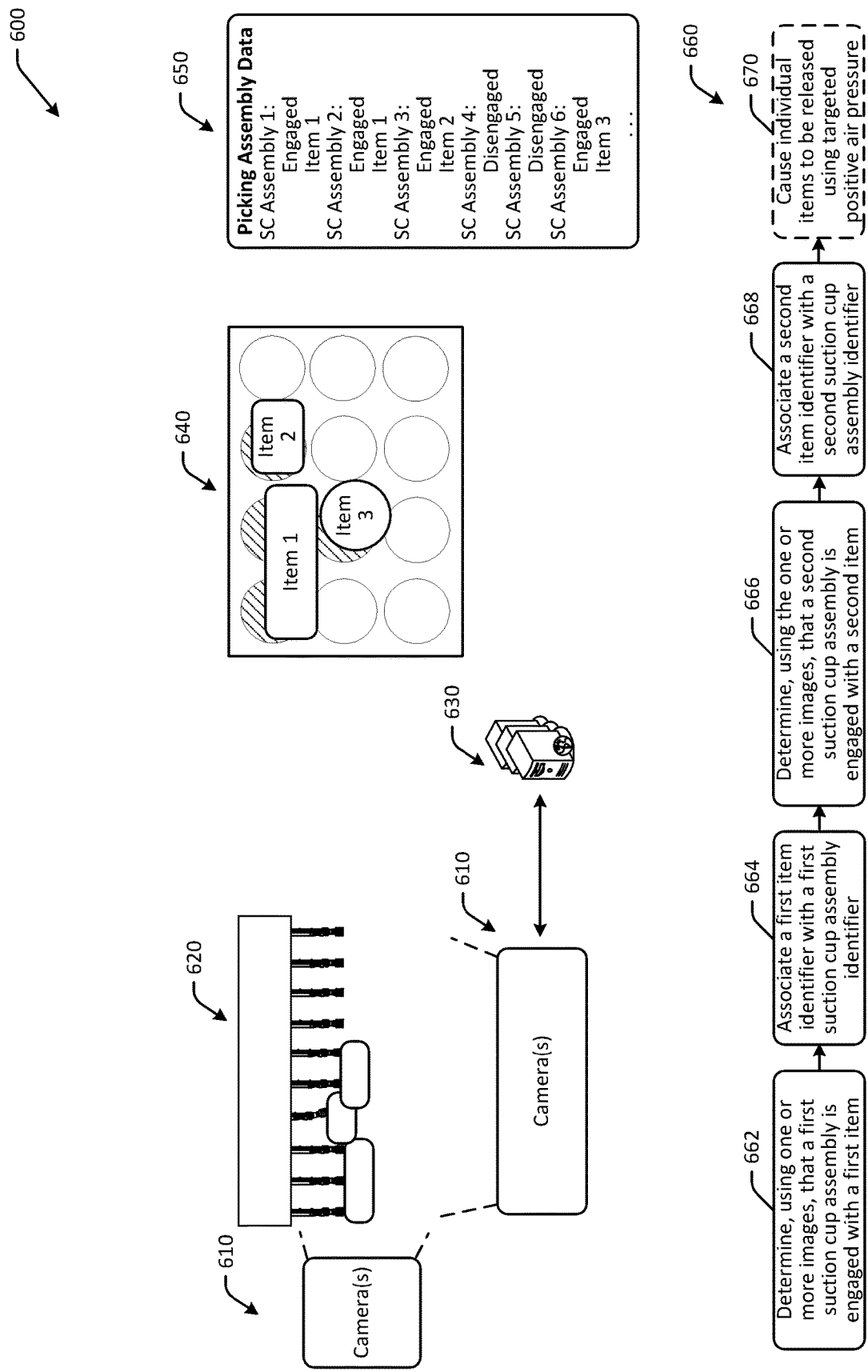
FIG. 6 is a schematic illustration of an example camera system and picking assembly data in accordance with one or more embodiments of the disclosure.

FIG. 6 is a schematic illustration of an example camera system and picking assembly data 600 in accordance with one or more embodiments of the disclosure. Other embodiments may include additional or fewer components. The illustration of FIG. 6 is not to scale, and may not be illustrated to scale with respect to other figures. The components illustrated in FIG. 6 may be components of the picking assemblies discussed with respect to FIGS. 1-5.

In some embodiments, a camera system or one or more cameras 610 may be used to image a picking assembly 620, such as from underneath the picking assembly 620 and/or on a side of the picking assembly 620 (so as to determine or otherwise detect occluded items that may not be visible using images captured from underneath the picking assembly 620, etc.), to determine where items that have been grasped by the picking assembly 620 are located, and, in some instances, what items have been grasped by the picking assembly 620. To determine where items are located and/or to identify items that have been grasped, the camera 610 may communicate with a server 630, which may be a local or remote server. The camera 610 and/or the server 630 may be configured to implement one or more optical flow algorithms to analyze image data. For example, image data may be analyzed to segment objects into discrete items, and to determine individual items that have been grasped. Optical flow may be used to detect motion within a neighborhood of pixels by registering changes in the color and intensity of pixels from frame to frame, or from image to image. Vectors indicating the direction and magnitude of detected motion can be created, and groups of similar vectors can be segmented from each other. Output of the optical flow algorithm may be isolates individual moving objects within a video or stationary objects in an image. For motion segmentation, a video may be divided into different regions based on detected motion. Neighborhoods of similar motion can be grouped together in a single layer, allowing for a dynamic scene to be broken into components of individual motion. Some embodiments may use dense optical flow methods that calculate the magnitude and direction of motion vectors for each pixel neighborhood, and from the result determine whether the neighborhood moved or not from frame to frame. This may result in gradient maps to be made of the entire frame. The gradient data can be used to isolate regions of similar motion and create motion layers. Other embodiments may implement point-based optical flow that detects feature points in each frame, and matches them together.

An example use case is depicted in FIG. 6. In FIG. 6, the camera 610 may be configured to capture an image 640 of a plurality of items after the picking assembly 620 has grasped the plurality of items. For example, the camera 610 may be placed at a location such that a lower surface of the picking assembly 620 is in the field of view of the camera 610. In some embodiments, the camera 610 may image the picking assembly 620 while the picking assembly 620 is in motion. For example, the picking assembly 620 may pass over the camera 610 after grasping the plurality of items.

The camera 610 may generate the image 640. The image 640 may be processed by the camera 610 and/or the server 630 to generate picking assembly data 650. The picking assembly data 650 may include data related to which suction cup assemblies are engaged, which items are engaged by which suction cup assemblies, item identification data (if available), and/or other data.

To process the image 640, the server 630 may implement the optical flow algorithm or another image processing algorithm to segment objects that have been grasped by the picking assembly 620 into discrete items. For example, the image 640 includes Item 1, Item 2, and Item 3 that have been grasped by the picking assembly 620. The image 640 may be processed to determine the discrete items, and optionally to determine an item identifier, such as a barcode, label, or other identifier that may be determined using the image and can be used to identify the respective items.

Based at least in part on the image processing output and the determinations related to which suction cup assemblies are engaged, the server 630 and/or another computer system may determine a correlation between which items are engaged by which suction cup assemblies, which can then be used to determine which suction cup assemblies are to be disengaged in order to release or drop a particular item.

The picking assembly data 650 may reflect the combination of image processing data and the suction cup assembly engagement data (that may be determined using sensors). For example, a first suction cup assembly (e.g., top left corner of the image 640) may be determined to be engaged with Item 1, a second suction cup assembly (e.g., to the right side of the first suction cup assembly in the image 640) may be determined to be engaged with Item 1, a third suction cup assembly (e.g., to the right side of the second suction cup assembly in the image 640) may be determined to be engaged with Item 2, a fourth suction cup assembly (e.g., to the right side of the third suction cup assembly in the top right of the image 640) may be determined to be disengaged, a fifth suction cup assembly (e.g., to the bottom of the first suction cup assembly in the image 640) may be determined to be disengaged, a sixth suction cup assembly (e.g., to the right side of the fifth suction cup assembly in the image 640) may be determined to be engaged with Item 3, and the remainder may be determined to be disengaged in the example of FIG. 6.

To correlate the detected items and the engaged suction cup assemblies and/or to generate the picking assembly data 650, an example process flow 660 may be executed. The process flow 660 may be executed by the camera 610 and/or the server 630. In some embodiments, the server 630 may be a controller for the system.

At block 662, it may be determined, using one or more images, that a first suction cup assembly is engaged with a first item. For example, based at least in part on placement of the item within the image, and corresponding data regarding whether a suction cup assembly at or near the placement of the item is engaged (e.g., the suction cup assembly locations are fixed), a determination may be made that the first suction cup assembly is engaged with a first item.

At block 664, a first item identifier of the first item may be associated with a first suction cup assembly identifier of the first suction cup assembly. For example, in some instances, the controller may be configured to determine item identifiers, such as barcodes, etc. for individual items of the plurality of items based at least in part on the image. Accordingly, a first item identifier of the first item may be associated with a first suction cup assembly identifier of the first suction cup assembly. In other embodiments, the item identifier may simply be "Item 1," "Item 2," and so forth based on discretely segmented objects.

At block 666, it may be determined, using the one or more images, that a second suction cup assembly is engaged with a second item. For example, based at least in part on placement of the item within the image, and corresponding data regarding whether a suction cup assembly at or near the placement of the item is engaged (e.g., the suction cup assembly locations are fixed), a determination may be made that the second suction cup assembly is engaged with a second item.

At block 668, a second item identifier of the second item may be associated with a second suction cup assembly identifier of the second suction cup assembly. For example, in some instances, the controller may be configured to determine item identifiers, such as barcodes, etc. for individual items of the plurality of items based at least in part on the image. Accordingly, a second item identifier of the first item may be associated with a second suction cup assembly identifier of the second suction cup assembly. Thus, the picking assembly data 650 may be generated.

At optional block 670, individual items may be caused to be released using targeted positive air pressure. For example, the controller may determine which suction cup(s) need to be disengaged in order to release a particular item. Accordingly, when an item is to be released, the controller may cause vacuum suction to cease at the designated suction cup(s). In some embodiments, to provide additional release and/or to ensure release, the controller may cause positive air pressure to be directed to the suction cup assemblies that are to be disengaged. For example, the controller may cause positive air pressure to be directed to the first suction cup assembly to release the first item, and may cause positive air pressure to be directed to the second suction cup assembly to release the second item. To confirm items have been released, another image may be captured in some embodiments.

In some embodiments, the controller may determine an order in which the items are to be released. For example, the order may be determined based on destination (e.g., there may be multiple conveyors disposed about the picking assembly and/or robotic arm, etc.). Accordingly, the controller may be configured to determine an order of release for the first item and the second item based at least in part on the image, and to cause the picking assembly to release the first item and the second item using the order of release.

Figure 7:
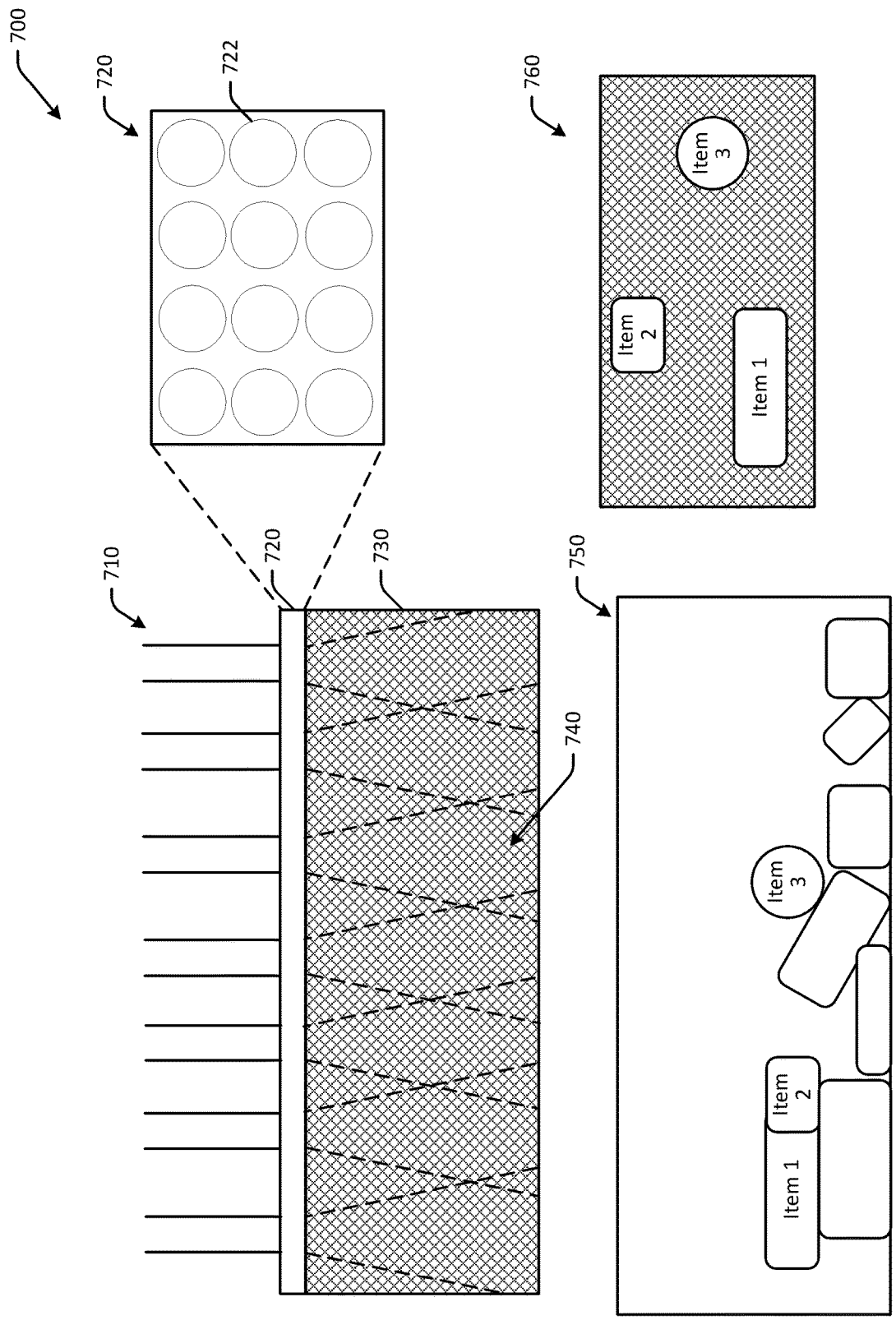
FIG. 7 is a schematic illustration of a picking assembly with a complaint foam layer in accordance with one or more embodiments of the disclosure.

FIG. 7 is a schematic illustration of a picking assembly with a complaint foam layer 700 in accordance with one or more embodiments of the disclosure. Other embodiments may include additional or fewer components. The illustration of FIG. 7 is not to scale, and may not be illustrated to scale with respect to other figures. Some of the components illustrated in FIG. 7 may be similar to components of the picking assemblies discussed with respect to FIGS. 1-6.

The picking assembly of FIG. 7 is an alternative embodiment and may include a compliant open cell foam layer or grate instead of the individual suction cup assemblies discussed with respect to FIGS. 4-6.

In FIG. 7, a robotic picking system may include a robotic arm and a picking assembly coupled to the robotic arm. The picking assembly may be configured to grasp a plurality of items. The picking assembly may include a plate 720 and a compliant foam layer 730 coupled to the plate 720. A number of vacuum lines 710 may be coupled to the plate 720. As depicted in a bottom detail view, the plate 720 may include a number of apertures 722. The vacuum suction provided by the vacuum lines 710 may pull or push air through the apertures 722. The vacuum lines 710 may include a first vacuum tube coupled to the plate 720, where airflow through the first vacuum tube flows through a first set of apertures of the plurality of apertures in the plate 720, and a second vacuum tube coupled to the plate 720, where airflow through the second vacuum tube flows through a second set of apertures of the plurality of apertures in the plate 720.

The compliant foam layer 730 may be a foam layer with a number of pathways between an upper surface and a lower surface. For example, the compliant foam layer may be like a sponge, but may have a number of pathways (linear or non-linear) extend through the compliant foam layer 730. Accordingly, air may flow (e.g., vacuum suction, positive air pressure, etc.) through the pathways and through the compliant foam layer 730. Other embodiments may include open cell foam layers, directional foam layers (e.g., having specific pathways formed in the foam layer, etc.), or other types of foam layers through which a plurality of airflow pathways are formed.

As vacuum suction or other airflow passes through the compliant foam layer 730, through the plate 720, and to the vacuum lines 710, the airflow may be substantially conical or form a substantially conical geometry 740. For example, positive air pressure output from individual vacuum lines 710 may flow outwards through the compliant foam layer 730 in a conical flow pattern, and negative air pressure provided by individual vacuum lines 710 may be pulled through the compliant foam layer 730 in a similar flow pattern. Accordingly, airflow provided by the vacuum lines may be somewhat separated but may overlap with airflow provided by adjacent vacuum lines. Therefore, there may not be an exact correlation between vacuum lines and any items grasped by the picking assembly.

During operation, the picking assembly may be lowered into a container 750 that may have a number of items in a cluttered environment. The picking assembly may grasp more than one item at a time and may lift the items out of the container. The compliant foam layer 730 of the picking assembly may have one or more dimensions that is less than corresponding dimensions of the container 750. For example, a first dimension, such as a length or width, of the compliant foam layer 730 may be smaller than a second dimension, such as a length or width, of the container 750 from which the plurality of items are grasped. A narrow gap may therefore be formed so as to facilitate airflow and to avoid lifting of the container 750 itself.

Similar to the embodiments of FIGS. 1-6, a camera may be configured to capture an image 760 of a plurality of items after the plurality of items are grasped by the picking assembly. The image 760 may be captured from a lower perspective. The image 760 may be processed to determine discrete items.

Unlike the embodiments of FIGS. 4-6, to release individual items, a controller may be configured to determine, using the image, that a first vacuum tube is at least partially engaged with a first item of the plurality of items, and to determine, using the image, that a second vacuum tube is at least partially engaged with the same first item. This may be due to proximity between the vacuum tubes. Accordingly, the controller may cause positive air pressure to be directed to the first vacuum tube and the second vacuum tube to release the first item. Another image may be captured to confirm the correct item was released. The picking assembly may be used in various environments, particularly in instances where lifting odd shaped objects, such as clamshells, is needed, as the vacuum suction may be relatively more distributed than individual suction cup assemblies.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
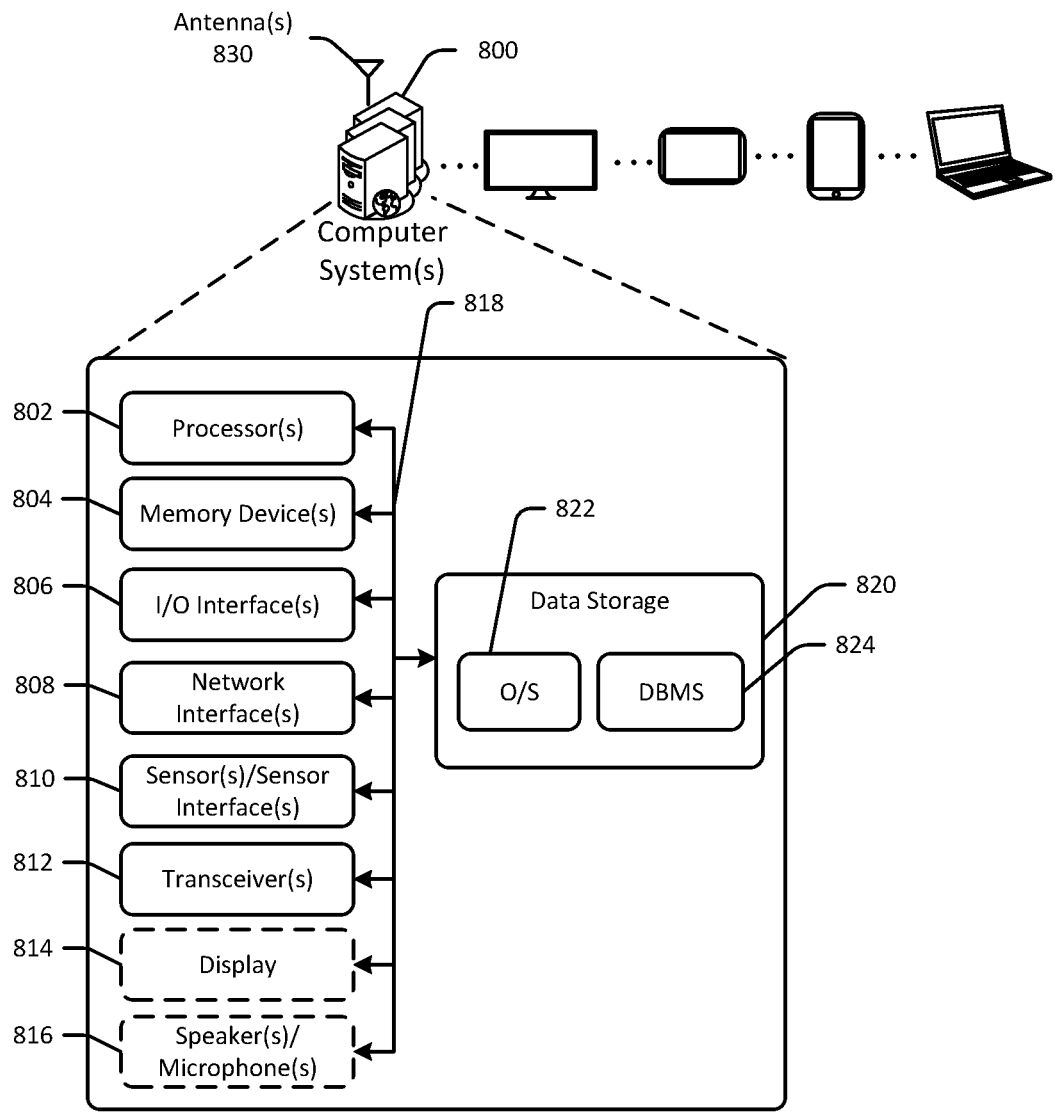
FIG. 8 schematically illustrates an example architecture of a computer system associated with an item picking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the robotic picking assemblies configured to grasp multiple items described in FIGS. 1-7, such as determining which suction cup assemblies are engaged, which suction cup assemblies are to be provided positive or negative air pressure, relationships or associations between suction cup assemblies and grasped items, where a robotic arm or other device is to position a picking assembly, and so forth.

The computer system(s) 800 may be configured to communicate with one or more servers, user devices, cameras, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s)

830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
a robotic arm;
a vacuum suction system configured to provide positive air pressure and negative air pressure;
a picking assembly coupled to the robotic arm and the vacuum suction system, the picking assembly configured to pick up and release a plurality of items, the picking assembly comprising:
a first suction cup assembly comprising a first suction cup and a first sensor coupled to the first suction cup, wherein the first sensor comprises:
a base;
a retractable pin coupled to the base, the retractable pin configured to move from a default position to a retracted position; and
a spring coupled to the retractable pin and configured to bias the retractable pin to the default position;
a second suction cup assembly comprising a second suction cup and a second sensor coupled to the second suction cup; and
a third suction cup assembly comprising a third suction cup and a third sensor coupled to the third suction cup; and
a controller configured to:
cause the picking assembly to grasp the plurality of items, the plurality of items comprising a first item and a second item;
cause the picking assembly to move from a first position to a second position; and
cause the picking assembly to release the first item at a first time and the second item at a second time.

2. The robotic picking assembly of claim 1, wherein the controller is further configured to:
determine that the vacuum suction system is providing negative air pressure at the picking assembly;
determine that the retractable pin is in the retracted position for a threshold length of time; and
determine that the first suction cup assembly is engaged.

3. The robotic picking assembly of claim 1, further comprising:
a camera configured to capture an image of the plurality of items after the picking assembly has grasped the plurality of items;
wherein the controller is further configured to:
determine an order of release for the first item and the second item based at least in part on the image, wherein the order of release indicates that the first item is to be released at the first time and the second item is to be released at the second time.

4. A system comprising:
a picking assembly coupled to a vacuum system, the picking assembly comprising:
a first suction cup assembly comprising a first suction cup and a first sensor, wherein the first sensor comprises:
a base;
a retractable pin coupled to the base, the retractable pin configured to move from a default position to a retracted position; and
a spring coupled to the retractable pin and configured to bias the retractable pin to the default position; and
a second suction cup assembly comprising a second suction cup and a second sensor; and
a controller configured to:
cause the picking assembly to grasp a plurality of items, the plurality of items comprising a first item and a second item;
cause the picking assembly to move from a first position to a second position; and
cause the picking assembly to release the first item at a first time and the second item at a second time.

5. The system of claim 4, wherein the first sensor is coupled to the first suction cup and the second sensor is coupled to the second suction cup.

6. The system of claim 4, wherein the controller is further configured to:
determine that a vacuum system is providing negative air pressure at the picking assembly;
determine that the retractable pin is in the retracted position for a threshold length of time; and
determine that the first suction cup assembly is engaged.

7. The system of claim 4, wherein the first sensor is a pressure sensor or an airflow sensor, and wherein the first suction cup assembly further comprises:
a third sensor comprising:
a base;
a retractable pin coupled to the base, the retractable pin configured to move from a default position to a retracted position; and
a spring coupled to the retractable pin and configured to bias the retractable pin to the default position; and
wherein the controller is further configured to:
determine, using the pressure sensor or the airflow sensor, a change in airflow in the first suction cup assembly between a first timestamp and second timestamp;
determine that the retractable pin is in the retracted position at the second timestamp; and
determine that the first suction cup assembly is engaged.

8. The system of claim 4, further comprising a third suction cup assembly, wherein the controller is further configured to:
determine that the first suction cup assembly is engaged;
determine that the second suction cup assembly is engaged;
determine that the third suction cup assembly is disengaged; and
cause negative air pressure at the third suction cup assembly to cease.

9. The system of claim 4, further comprising:
a camera configured to capture an image of the plurality of items after the picking assembly has grasped the plurality of items; and
wherein the controller is further configured to:
determine an order of release for the first item and the second item based at least in part on the image, the order of release indicating that the first item is to be released at the first time and the second item is to be released at the second time.

10. The system of claim 9, wherein the controller is further configured to:
determine, using the image, that the first suction cup assembly is engaged with the first item;
associate a first item identifier with a first suction cup assembly identifier;
determine, using the image, that the second suction cup assembly is engaged with the second item; and
associate a second item identifier with a second suction cup assembly identifier.

11. The system of claim 10, further comprising a third suction cup assembly, wherein the controller is further configured to:
   determine, using the image, that the third suction cup assembly is disengaged;
   cause positive air pressure to be directed to the first suction cup assembly to release the first item; and
   cause positive air pressure to be directed to the second suction cup assembly to release the second item.

12. The system of claim 4, wherein the first sensor is a proximity sensor or a contact sensor, and wherein the controller is further configured to:
   determine, using the proximity sensor or the contact sensor, that the first suction cup is in contact with or adjacent to the first item; and
   determine that the first suction cup assembly is engaged.

13. The system of claim 4, further comprising:
   a robotic arm coupled to the picking assembly and configured to move the picking assembly from the first position to the second position; and
   wherein the vacuum system is configured to generate negative air pressure to grasp the plurality of items, and positive air pressure to release the plurality of items.

14. A robotic picking system comprising:
   a robotic arm; and
   a picking assembly coupled to the robotic arm and configured to grasp a plurality of items, the picking assembly comprising:
      a plate comprising a plurality of apertures;
      a compliant foam layer coupled to the plate, the compliant foam layer comprising a plurality of pathways between an upper surface and a lower surface;
      a first vacuum tube coupled to the plate, wherein airflow through the first vacuum tube flows through a first set of apertures of the plurality of apertures; and
      a second vacuum tube coupled to the plate, wherein airflow through the second vacuum tube flows through a second set of apertures of the plurality of apertures;
   a camera configured to capture an image of the plurality of items after the plurality of items are grasped by the picking assembly; and
   a controller configured to:
      determine, using the image, that the first vacuum tube is disposed adjacent to a first item of the plurality of items, wherein the compliant foam layer is disposed between the first vacuum tube and the first item;
      determine item identifiers for individual items of the plurality of items based at least in part on the image;
      determine, using the image, that the second vacuum tube is disposed adjacent to the first item, wherein the compliant foam layer is disposed between the first vacuum tube and the first item; and
      cause positive air pressure to be directed to the first vacuum tube and the second vacuum tube to release the first item.

15. The robotic picking system of claim 14, wherein the controller is further configured to:
   determine an order of release for individual items of the plurality of items based at least in part on the image.

* * * * *